No. 841,118. PATENTED JAN. 15, 1907.
C. T. BYRNE.
PLUMBER'S TRAP.
APPLICATION FILED JAN. 29, 1906.
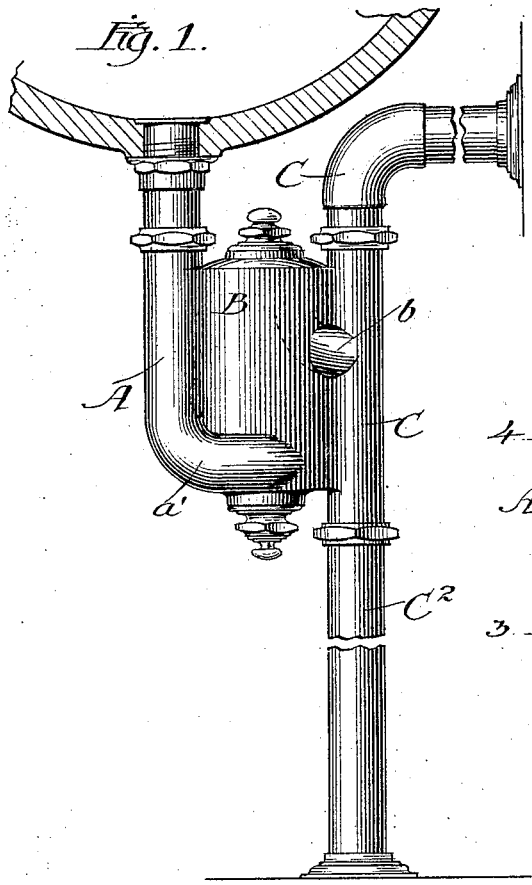
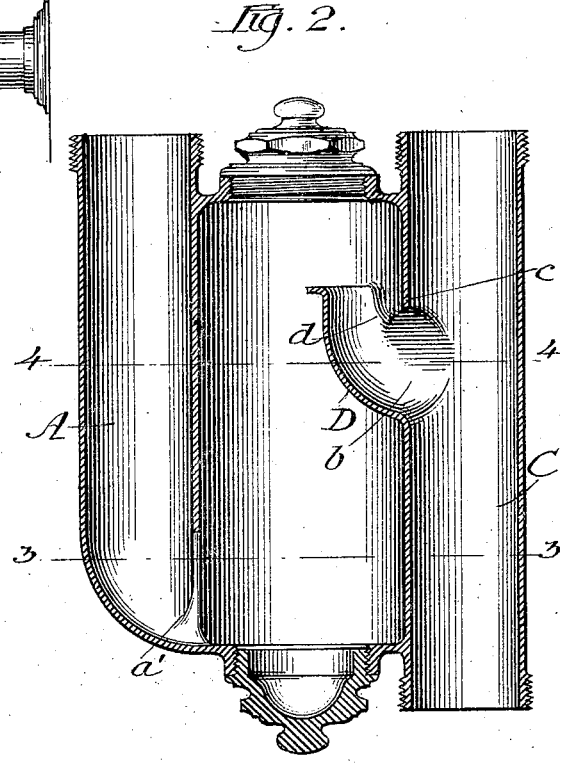
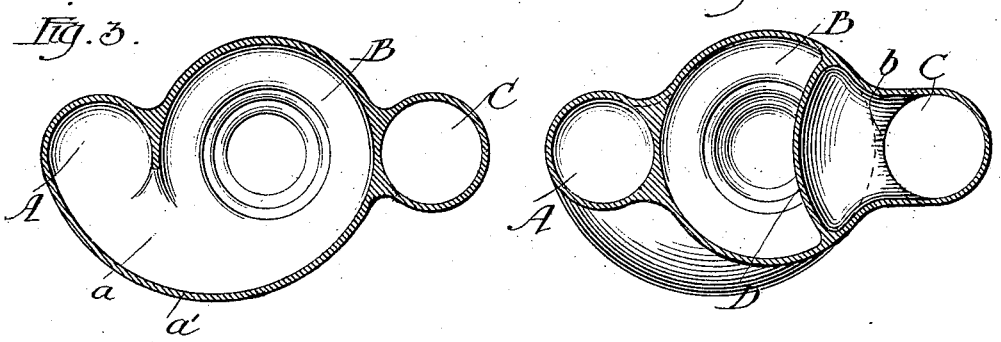
Witnesses:
Frank Blanchard
Jessie E. Litsey
Inventor:
Charles T. Byrne
By Hopkins
Attorney.

UNITED STATES PATENT OFFICE.

CHARLES T. BYRNE, OF CHICAGO, ILLINOIS.

PLUMBER'S TRAP.

No. 841,118.   Specification of Letters Patent.   Patented Jan. 15, 1907.

Application filed January 29, 1906. Serial No. 298,491.

*To all whom it may concern:*

Be it known that I, CHARLES T. BYRNE, a citizen of the United States, residing at Chicago, in the county of Cook and State of Illinois, have invented certain new and useful Improvements in Plumbers' Traps, of which the following is a specification.

The subject of the present invention is a plumber's trap which is adapted for use in connection with fixtures of various kinds, including washbasins, sinks, water-closets, and, in fact, all fixtures that require traps.

The invention relates more particularly to that class of traps which discharge into what is known as a "stack," being a vertical pipe made up of a number of pipe-sections placed end to end and extending from the ground or sewer connection to a point above the highest fixture to be served, preferably to the roof. This stack also takes the names "waste-pipe" and "vent-pipe," so much of it as is below any given trap being known as the "waste-pipe" for that trap, while so much of it as is above the level of any given trap is known as the "vent-pipe" for that trap.

Broadly stated, the object of the invention is to provide a trap of improved construction. Its specific objects will appear in the following description.

The invention consists in the features of novelty that are hereinafter described with reference to the accompanying drawings, which is made a part hereof, and in which—

Figure 1 is a side elevation of a trap embodying the invention and adjacent portions of the stack. Fig. 2 is a vertical section of the trap proper. Fig. 3 is a horizontal section thereof on the line 3 3, Fig. 1, looking downward. Fig. 4 is a section on the line 4 4, Fig. 2.

The trap is preferably cast in a single piece, excepting that it is provided at bottom with a clean-out, which is closed by a threaded cap or plug. The trap comprises a vertical branch A, hereinafter called the "inlet branch," a chamber B, a pipe-section C, and a dam or partition D, located in the chamber. The inlet branch is open at top for receiving the connection from the fixture to be drained and at bottom communicates with the lower portion of the chamber B through an opening $a$, the opening being arranged at one side of the center of the chamber and the walls of the inlet branch and chamber being deflected, as shown at $a'$, in order that the water will enter the chamber tangentially. The chamber B and pipe-section C communicate with each other through an opening $b$, which is located below the top of the chamber, and the dam or partition D extends from a level above the top of said opening downward to a level below the bottom of said opening. The walls of the dam or partition extend from side to side of the chamber, so that the dam or partition prevents the direct admission of water from the chamber B to the opening $b$ and compels the water to approach said opening by passing over the top of the dam, sufficient space for this being left between the top of the dam and the top of the chamber. The effect of this is to cause the water to enter the pipe-section C in a downward direction, and the advantage of this is that it prevents grease and solid matter from splashing up in the pipe-section C above the top of the opening $b$, or, to state the matter differently, the portion $c$ of the dividing-wall between the chamber B and the pipe-section C is, in effect, a lip extending downward into a pocket $d$, which the dam or partition provides.

Another advantage of the described construction is that it prevents any given trap from being siphoned by the flow of water through the stack from a fixture located at a higher level. The pipe-section C, when the trap is arranged in a system, forms, in effect, one member or pipe-section of the stack, the adjoining members of this stack located immediately above and below the member C being shown at $C'$ and $C^2$, respectively.

It will be seen that the member or section $C'$ takes the form of a bend, and it will be understood that so far as the identical trap shown in the drawings is concerned the entire stack above the level of the top of the opening $b$ serves as the vent-pipe, since there are no other fixtures at higher level.

It will be understood also that so far as the identical trap shown in the drawings is concerned the entire stack below the level of the opening $b$ serves as the waste-pipe.

It will also be understood that the stack may be of any desired height to accommodate any desired number of fixtures arranged at different levels and that the terminology applied to the different portions of the stack with reference to the identical trap shown in the drawings will be applied to each of the other traps.

What I claim as new, and desire to secure by Letters Patent, is—

1. A trap having an inlet branch, a chamber through which said inlet branch communicates, a pipe-section communicating with said chamber through an opening and extending both above and below said opening, and a dam or partition located in the chamber opposite the opening, and extending from a level above said opening to a level below it, substantially as described.

2. A trap having an inlet branch, a chamber with the lower portion of which said inlet branch communicates through an opening or passage disposed tangentially with respect to the chamber, a pipe-section communicating with said chamber through an opening below the top thereof, said pipe-section extending both above and below said opening, and a dam or partition located in the chamber opposite the opening and extending from a level above said opening downward to a level below it, substantially as described.

3. A trap having an inlet branch, a chamber with the lower portion of which said inlet branch communicates, a pipe-section communicating with the chamber through an opening below the top thereof, said pipe-section extending both above and below said opening and being open at both ends, and a dam or partition located in the chamber opposite the opening and extending from a level above said opening to a level below it, substantially as described.

4. A trap having a vertical inlet branch, a vertical chamber with the lower portion of which said inlet branch communicates, through an opening, a vertical pipe-section communicating with said chamber through an opening below the top thereof and above the opening first aforesaid, said pipe-section extending both above and below the opening and being open at both ends, and a dam or partition located in the chamber opposite the opening and extending from a level above said opening downward to a level below it, substantially as described.

CHARLES T. BYRNE.

Witnesses:
L. M. HOPKINS,
JESSIE E. LITSEY.